(12) United States Patent
Pinto et al.

(10) Patent No.: US 8,221,577 B2
(45) Date of Patent: Jul. 17, 2012

(54) FABRICATING THERMOSET PLATES EXHIBITING UNIFORM THICKNESS

(75) Inventors: Yariv Y. Pinto, Petach Tikva (IL); Murray Figov, Ra'anana (IL)

(73) Assignee: Eastman Kodak Company, Rochester, NY (US)

( * ) Notice: Subject to any disclaimer, the term of this patent is extended or adjusted under 35 U.S.C. 154(b) by 894 days.

(21) Appl. No.: 12/327,914

(22) Filed: Dec. 4, 2008

(65) Prior Publication Data
US 2010/0139514 A1  Jun. 10, 2010

(51) Int. Cl.
*B41C 1/00* (2006.01)
*B32B 37/04* (2006.01)

(52) U.S. Cl. .......... 156/308.2; 156/309.6; 101/395; 101/401.1

(58) Field of Classification Search ........ 101/395, 101/401.1, 401.4; 156/308.2, 308.6, 309.3–309.9
See application file for complete search history.

(56) References Cited

U.S. PATENT DOCUMENTS

| 4,424,089 A | 1/1984 | Sullivan |
| 5,798,202 A | 8/1998 | Cushner et al. |
| 5,804,353 A | 9/1998 | Cushner et al. |
| 6,511,784 B1 | 1/2003 | Hiller et al. |
| 6,776,095 B2 * | 8/2004 | Telser et al. ......... 101/401.1 |

FOREIGN PATENT DOCUMENTS

EP  0 762 213 A2  3/1997
WO  WO 93/23253 A  11/1993

* cited by examiner

*Primary Examiner* — Katarzyna Wyrozebski Lee
*Assistant Examiner* — Scott W Dodds
(74) *Attorney, Agent, or Firm* — J. Lanny Tucker

(57) ABSTRACT

A method of manufacturing a flexographic plate having a uniform thickness comprises providing a thermoset layer having at least one uneven side; providing a thermoplastic layer having a first and a second side; attaching the first side of the thermoplastic layer to the uneven side of the thermoset layer thereby forming a flexographic plate; and calendering the flexographic plate via a series of heated pairs of rollers thereby creating a flexographic plate with a uniform thickness.

13 Claims, 7 Drawing Sheets

FABRICATING THERMOSET PLATES EXHIBITING UNIFORM THICKNESS

FIELD OF THE INVENTION

The present invention relates to manufacturing of flexographic plates, and more specifically to a method of formation of flexographic plates with uniform thickness.

BACKGROUND

Prior to setting forth the background of the invention, it may be helpful to set forth definitions of certain terms that will be used hereinafter.

The term "thermoplastic material" or "thermoplastic" as used herein in this application, relates to a plastic that melts to a liquid when heated and freezes to a brittle, very glassy state when cooled sufficiently. Most thermoplastics are high-molecular-weight polymers whose chains associate through weak Van der Waals forces (polyethylene); stronger dipole-dipole interactions and hydrogen bonding (nylon); or even stacking of aromatic rings (polystyrene). Thermoplastic polymers can be re-melted and remolded. Many thermoplastic materials are addition polymers; e.g., vinyl chain-growth polymers such as polyethylene and polypropylene.

The term "thermosetting plastic", "thermoset" or "thermoset material" as used herein in this application, relates to polymer materials that irreversibly cure form. The cure may be done through heat (generally above 200 degrees Celsius), through a chemical reaction (two-part epoxy, for example), or irradiation such as electron beam processing.

Uncontrolled reheating of the material results in reaching the decomposition temperature before the melting point is obtained. Therefore, a thermoset material cannot be melted and re-shaped after it is cured. Thermoset materials are generally stronger than thermoplastic materials due to a three-dimensional network of bonds, and are also better suited to high-temperature applications up to the decomposition temperature of the material.

The term "flexographic printing" or "flexography" as used herein in this application, relates to a printing method that involves creating a positive mirrored master of the required image as a three-dimensional relief in a rubber or polymer material. A measured amount of ink is deposited upon the surface of the printing plate (or printing cylinder) using an engraved anilox roll whose texture holds a specific amount of ink. The print surface then rotates, contacting the print material which transfers the ink.

Flexographic printing is a technologically challenging task. Minute differences in plate thickness, consistency and even surface energy can cause large deviations in ink transfer uniformity. Such deviations may result in poor quality printing and non smooth printed areas. The thickness tolerances that are commonplace in the flexographic printing ranges from −13 to +13 microns ($\mu$m). This value was chosen since these are the tolerances available for printing drums, gears and cogwheels.

Manufacturing printing plates to a thickness uniformity of ±13 $\mu$m is not an easy task. Conventional and Laser Ablation Mask System (LAMS) plates are made of a thermoplastic material which gives leverage to fabrication with systems such as extrusion followed by precise calendering of the sheet that is to be cut into plates. Plates that are imaged by direct engraving, however, have to be thermoset. The plate material has to be thermoset to overcome the problem of edge melting by the engraving laser as well as to give chemical and solvent resistance and mechanical strength. Plate materials that are used in the direct engraving industry include rubber, crosslinked photopolymer and silicone based rubbers. Rubber plates are made by calendering the sheet material with heated rollers to induce vulcanization. Photopolymer material is exposed to UV to induce crosslinking, introducing chemical and solvent resistance. Since photopolymer plates are transparent to UV and near IR, these plates are engraved exclusively by $CO_2$ lasers. Some of the direct engraving plates on the market are ground to give the thickness uniformity prior to imaging.

Fabricating thermoset materials in sheet form to a tolerance of ±13 $\mu$m from liquid or paste poses even more challenges. Thermoset pastes are rarely extruded for fear of clogging the extruder. Special precautions must be taken to avoid sticking of the material to the calendering rollers, if such a system is chosen. In fact, many manufacturers of extrusion equipment avoid experimenting with thermoset materials because of the difficulties involved in cleaning out the extruders. Casting the materials does not give tolerances of the above mentioned figures over standard plate sizes.

SUMMARY OF THE INVENTION

Briefly, according to one aspect of the present invention, there is provided a flexographic plate comprising: a thermoset layer with at least one uneven side; and a thermoplastic layer attached to one uneven side of the thermoset layer to form a flexographic plate.

Embodiments of the present invention provide a path to achieving the required tolerances for flexographic printing plates with thermoset materials. The invention utilizes the advantages of thermoplastic materials in formability in order to give form to thermoset materials. Basically, a sheet of thermoset material that has less thickness uniformity than required is attached to a thermoplastic material, and the bi-layer or multilayered (in case more than just the thermoset and thermoplastic layers form the plate) sheet is calendered to the required tolerance by means already in existence for thermoplastic materials. The thermoset layer will then form the image side of the printing plate.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

The subject matter regarded as the invention will become more clearly understood in light of the ensuing description of embodiments herein, given by way of example and for purposes of illustrative discussion of the present invention only, with reference to the accompanying drawings (Figures, or simply "FIG."), wherein.

The drawings together with the description make apparent to those skilled in the art how the invention may be embodied in practice.

DETAILED DESCRIPTION OF THE INVENTION

In the following detailed description, numerous specific details are set forth in order to provide a thorough understanding of the disclosure. However, it will be understood by those skilled in the art that the teachings of the present disclosure may be practiced without these specific details. In other instances, well-known methods, procedures, components and circuits have not been described in detail so as not to obscure the teachings of the present disclosure.

Prior to setting forth the detailed description of the invention, it may be helpful to set forth definitions of certain terms that will be used hereinafter.

The term "calendering" as used herein in this application, relates to the process of using a series of hard pressure rollers for smoothing out a sheet of material that is inserted between the rollers.

The term "uniform" or "smooth" as used herein in this application, relates to a surface of a sheet exhibiting thickness differences substantially smaller than approximately 13 μm. Similarly, the term "uneven" as used herein in this application, relates to a surface of a sheet of material exhibiting thickness differences substantially larger than approximately 13 μm.

According to some embodiments of the invention, there is provided a process of manufacturing plates of substantial high level of thickness uniformity by combining at least one sheet of thermoset material, the sheet not having the desired thickness uniformity and thermoplastic materials. There are existing methods of handling thermoplastic materials to get highly uniform printing plates; however, these methods are not suitable for most thermoset materials.

Figure 1:
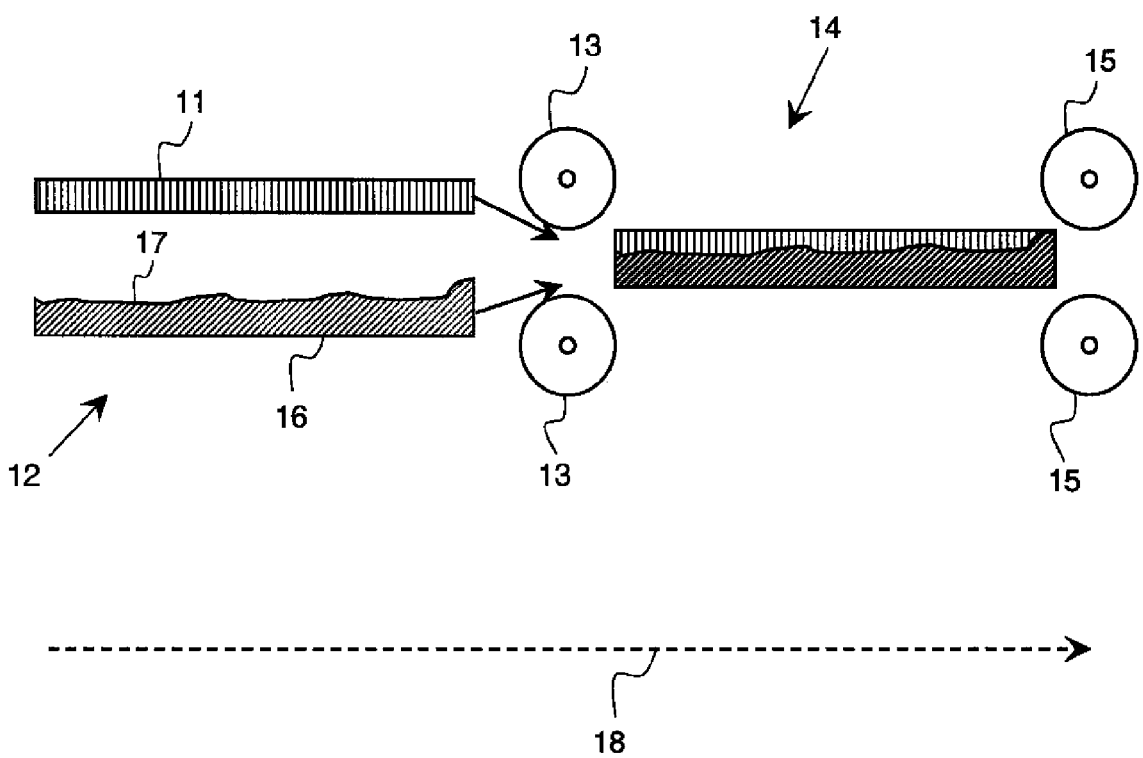
FIG. 1 is a schematic process diagram illustrating a process of manufacturing a flexographic plate comprising thermoplastic layer and a thermoset layer according to some embodiments of the invention.

FIG. 1 is a schematic process diagram illustrating a process of manufacturing a flexographic plate comprising thermoplastic layer and a thermoset layer according to some embodiment of the invention. According to some embodiments, there is provided a sheet of thermoset layer 12 having an uneven surface 17. Thermoset layer 12 is being attached to a layer of a thermoplastic material 11. The combined thermoset layer 12 and thermoplastic layer 11 are then calendered along plate movement path 18 by a series of heated roller pairs 13 and 15 for achieving flexographic plate 14 exhibiting thickness uniformity in a manner that resembles calendering a pure thermoplastic sheet.

According to some embodiments, thermoset layer 12 may be cast on a smooth surface to resulting in one smooth side 16 of thermoset layer 12 and then laminated onto thermoplastic layer 11 having a thickness of at least the largest level of non uniformity of the uneven surface 17 of thermoset layer 12.

According to some embodiments, flexographic plate 14 is calendered by the first pair of rollers 13 and further on by the last pair of rollers 15 to desired predefined thickness uniformity. Additional pairs of rollers may be used along plate movement path 18. The temperature applied on flexographic plate 14 decreases along plate movement path 18 between each position of the pairs of rollers. Specifically, the first pair of rollers 13 uses a higher temperature than the last pair of rollers 15 in order to promote the cross linking as the material passes through the calendering system.

According to some embodiments, plate uniformity of smooth side 16 of thermoset layer 12 may be achieved without casting thermoset layer 12 on a smooth surface during production. The pressure applied by the calendering rollers 13 and 15 on side 16 in addition with the hardening of the thermoplastic layer 11 thus pressing side 17 from the opposite side of layer 12 thereby resulting in a uniform flexographic plate 14.

The high temperature applied on rollers 13 causes the thermoplastic material 11 to melt and to fill the uneven side 17 of layer 12. As the printing plate 12 progresses towards direction 18, the temperature at the printing plate 14 movement path 18 decreases. The temperature reduction causes the printing plate 14 to harden and form an even thickness plate 14.

Figure 2:
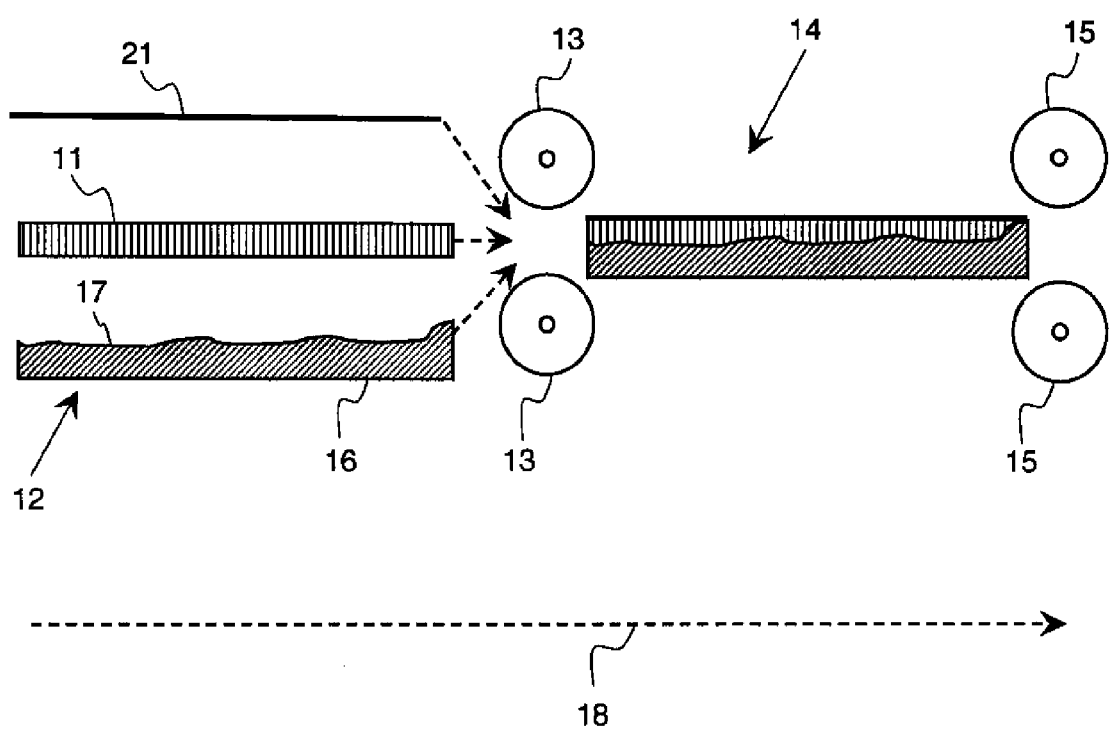
FIG. 2 is a schematic process diagram illustrating a process of manufacturing a flexographic plate comprising thermoplastic layer, a thermoset layer and a dimensional support layer according to some embodiments of the invention.

FIG. 2 is a schematic process diagram illustrating a process of manufacturing a flexographic plate comprising thermoplastic layer, a thermoset layer and a dimensional support layer according to some embodiment of the invention. For structural support purposes at least one additional two-dimensional structural support layer 21 such as Polyethylene Terephthalate (PET) layer may be used in the process.

Figure 3:
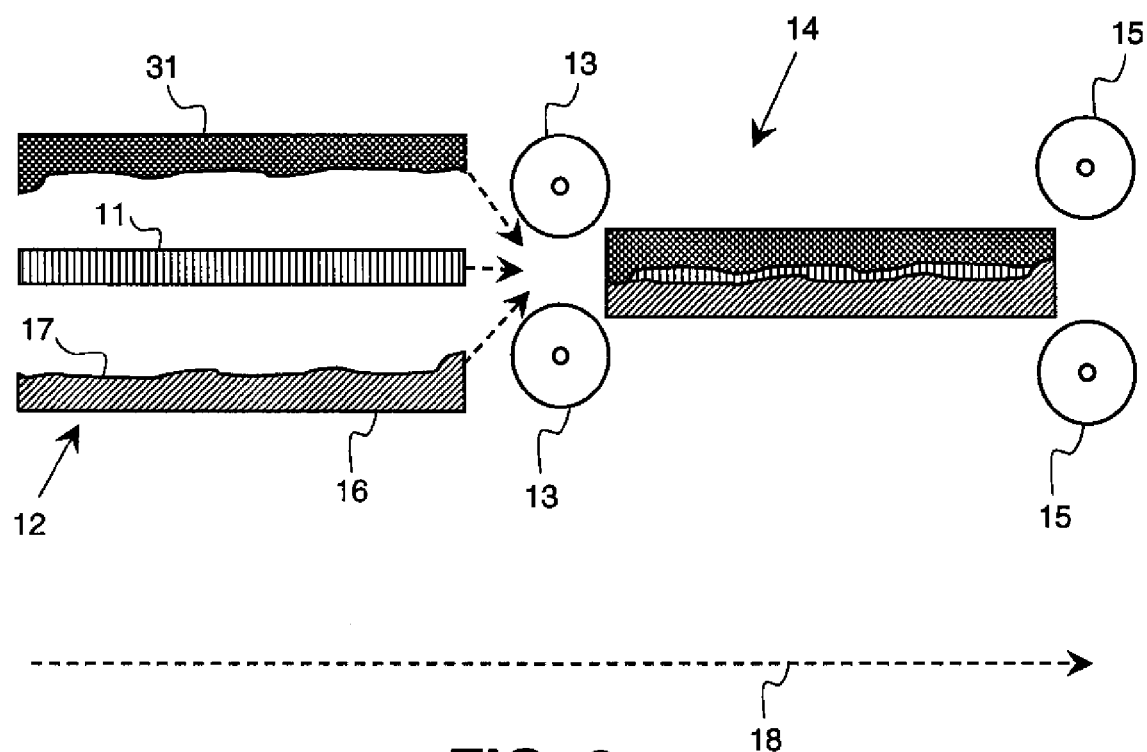
FIG. 3 is a schematic process diagram illustrating a process of manufacturing a flexographic plate comprising a thermoplastic layer, a thermoset layer, and a cushion layer according to some embodiments of the invention.

FIG. 3 is a schematic process diagram illustrating a process of manufacturing a flexographic plate comprising a thermoplastic layer, a thermoset layer, and a cushion layer according to some embodiment of the invention. Specifically, cushion layer 31 may be made from either thermoset or thermoplastic materials. Such a material may be added as long as there is at least one thermoplastic layer 11 thick enough to fill the non-uniform surfaces of the other layers: 12 and 21 or 31.

Figure 4:
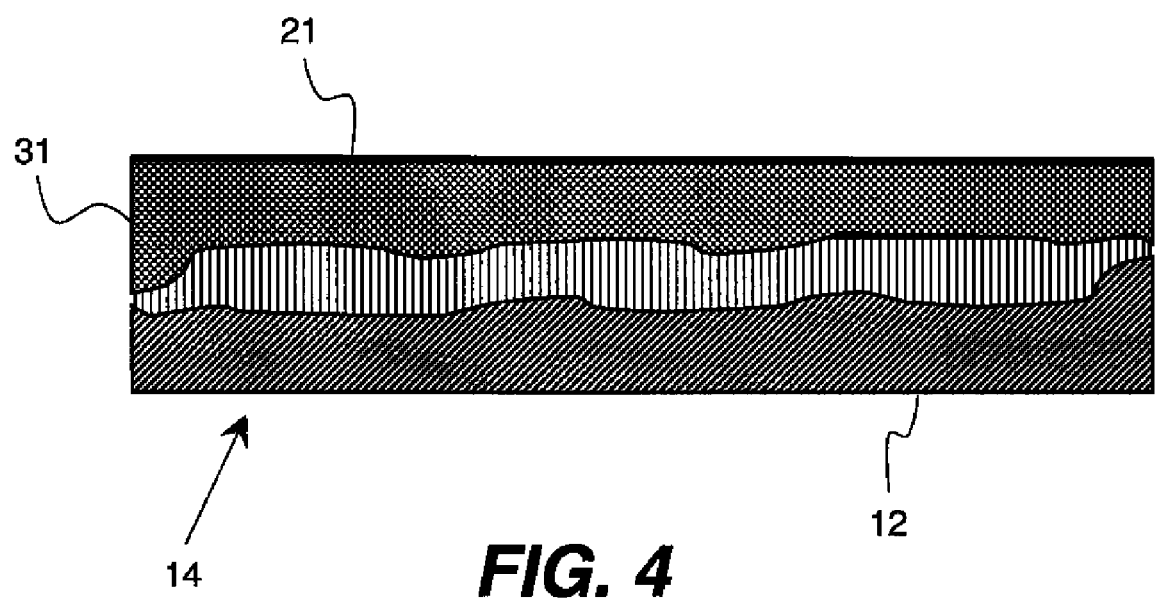
FIG. 4 is a schematic sectional view illustrating a flexographic plate comprising a thermoplastic layer, a thermoset layer, and a cushion layer according to some embodiments of the invention.

FIG. 4 is a schematic sectional view illustrating a flexographic plate comprising a thermoplastic layer, a thermoset layer, and a cushion layer according to some embodiment of the invention. Two-dimensional structural support layer 21 can be attached to the cushion layer 31 of plate 14 for preventing plate deformation while mounted on the imaging drum during the imaging process.

Figure 5:
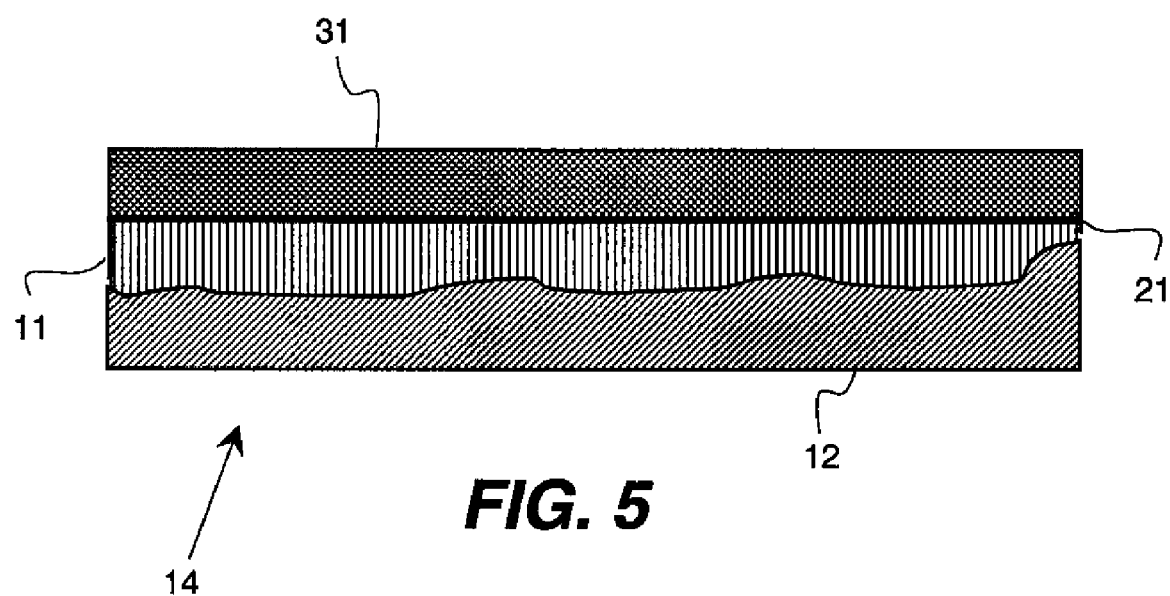
FIG. 5 is a schematic sectional view illustrating a flexographic plate comprising a thermoplastic layer, a thermoset layer, and a cushion layer attached to a dimensional support layer according to some embodiments of the invention.

FIG. 5 is a schematic sectional view illustrating a flexographic plate comprising a thermoplastic layer, a thermoset layer, and a cushion layer attached to a dimensional support layer according to some embodiment of the invention. According to some embodiments, the position of cushion layer 31 and two-dimensional structural support layer 21 can be swapped.

Figure 6:
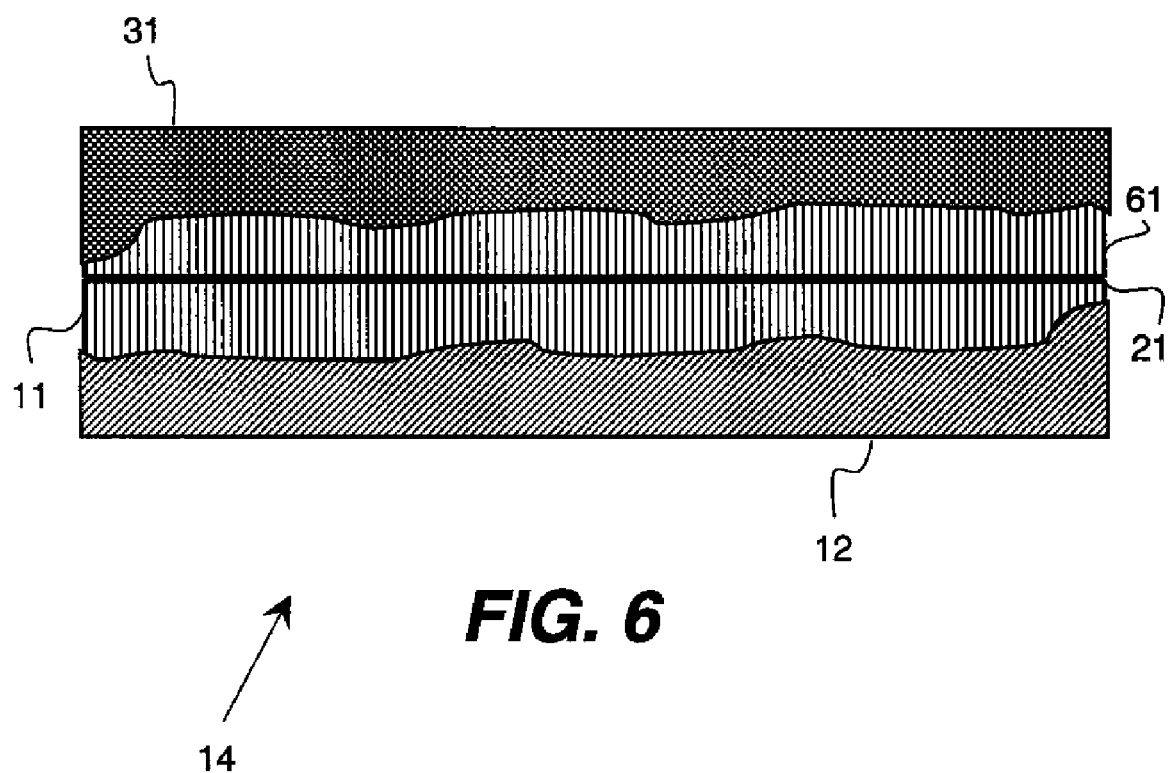
FIG. 6 is a schematic sectional view illustrating a flexographic plate comprising a thermoset layer, and dimensional support layer positioned between two thermoplastic layers.

FIG. 6 is a schematic sectional view illustrating a flexographic plate comprising a thermoset layer, and two-dimensional structural support layer 21 positioned between two thermoplastic layers 11 and 61 of plate 14.

Figure 7:
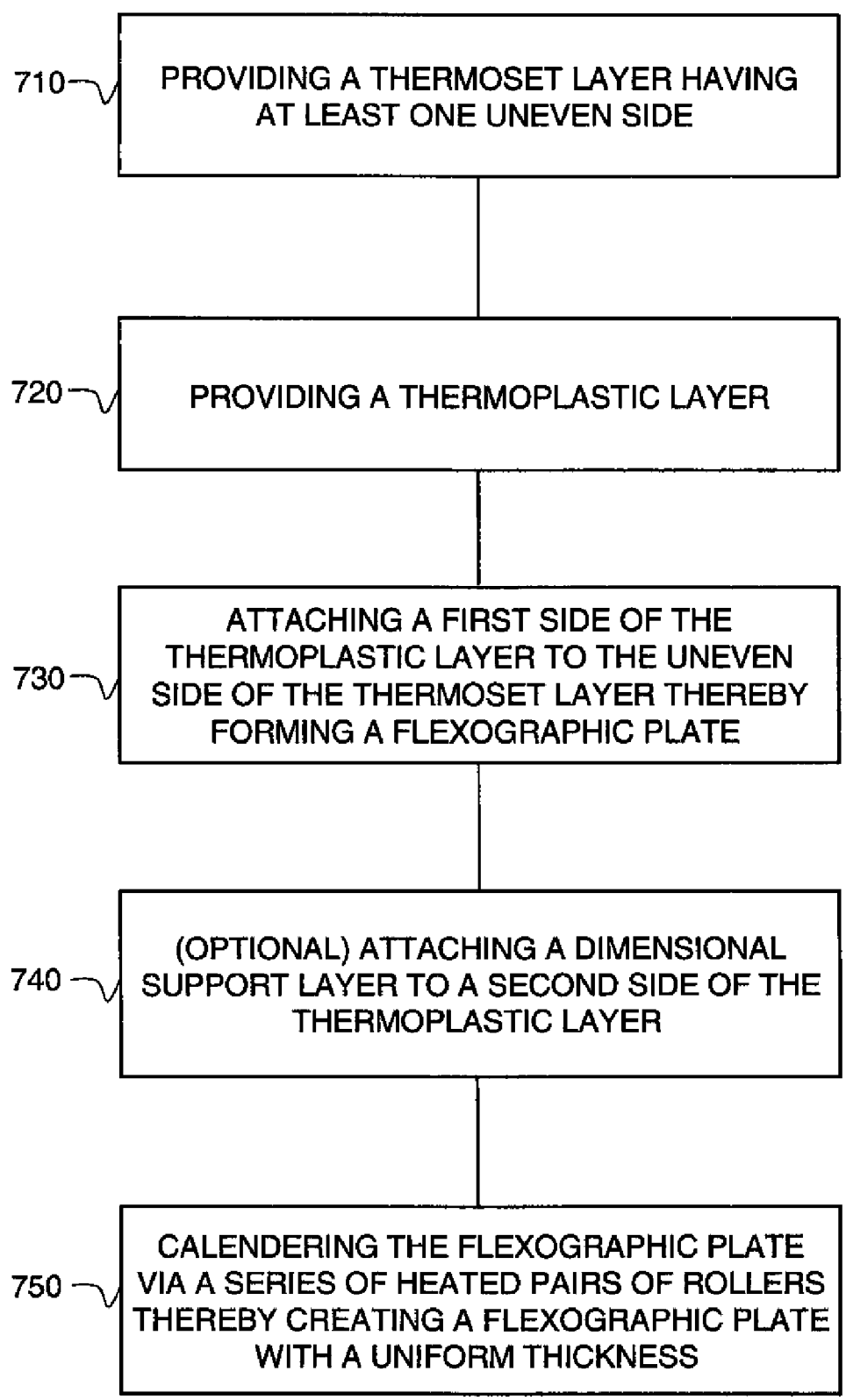
FIG. 7 is a high level flowchart showing a method of manufacturing a flexographic plate having a uniform thickness according to some embodiments of the invention.

FIG. 7 is a high level flowchart showing a method of manufacturing a flexographic plate having a uniform thickness, the method comprising: providing a thermoset layer having at least one uneven side 710; providing a thermoplastic layer having a first and a second side 720; attaching the first side of the thermoplastic layer to the uneven side of the thermoset layer thereby forming a flexographic plate 730;

Optionally attaching a dimensional support layer to the thermoplastic layer 740; and calendering the flexographic plate via a series of heated pairs of rollers thereby creating a flexographic plate with a uniform thickness 750.

The invention has been described in detail with particular reference to certain preferred embodiments thereof, but it will be understood that variations and modifications can be effected within the scope of the invention.

Thus, this invention includes a method of manufacturing a flexographic plate having a uniform thickness, the method comprising:

providing a thermoset layer having at least one uneven side;

providing a thermoplastic layer having a first and a second side; attaching the first side of the thermoplastic layer to the uneven side of the thermoset layer thereby forming a flexographic plate; and calendering the flexographic plate via a series of heated pairs of rollers thereby creating a flexographic plate with a uniform thickness.

The thermoplastic layer can comprise a dimensional support layer.

Calendering the flexographic plate can be preceded by attaching a dimensional support layer to the second side of the thermoplastic layer.

Attaching a two-dimensional structural support layer to the second side of the thermoplastic layer can be followed by providing a cushion layer and attaching the cushion layer to the dimensional support layer.

Calendering the flexographic plate can be preceded by providing a cushion layer and attaching the cushion layer to the second side thermoplastic layer.

Providing a cushion layer and attaching the cushion layer to the second side of the thermoplastic layer can be followed by providing a dimensional support layer and attaching the two-dimensional structural support layer to the cushion layer.

The cushion layer can be a thermoset material or a thermoplastic material.

The series of heated pairs of rollers are generally located along a flexographic plate movement path and the heat of the heated pairs of rollers can decrease along the flexographic plate movement path.

The thermoplastic layer can have a thickness of at least 13 µm.

Additional layers can be added prior to calendering the flexographic plate.

This invention also provides a flexographic plate comprising: a thermoset layer having at least one uneven side; and a thermoplastic layer having a first side and a second side, wherein the at least one uneven side of thermoset layer is attached to the first thermoplastic layer; and wherein the attached thermoplastic and thermoset layers are calendered thereby forming a flexographic plate having a uniform thickness.

PARTS LIST

11—thermoplastic layer
12—thermoset layer with uneven face
13—first pair of calendering rollers
14—printing plate with thermoset (printing side) layer at the bottom
15—last pair of calendering rollers
16—thermoset layer smooth side—used for engraving
17—uneven side
18—direction of plate movement path
21—two-dimensional structural support layer
31—cushion layer—made from thermoset or thermoplastic material
61—second thermoplastic layer
710—providing a thermoset layer having at least one uneven side
720—providing a thermoplastic layer having a first and a second side
730—attaching the first side of the thermoplastic layer to the uneven side of the thermoset layer thereby forming a flexographic plate
740—optionally attaching a dimensional support layer to the thermoplastic layer
750—calendering the flexographic plate via a series of heated pairs of rollers thereby creating a flexographic plate with a uniform thickness

The invention claimed is:

1. A method of manufacturing a flexographic plate having a uniform thickness, the method comprising:

providing a thermoset layer having at least one uneven side;

providing a thermoplastic layer having a first and a second side;

attaching the first side of the thermoplastic layer to the uneven side of the thermoset layer thereby forming a flexographic plate blank;

calendering the flexographic plate blank via a series of heated pairs of rollers thereby creating a flexographic plate blank with a uniform thickness; and engraving the flexographic plate blank to form a flexographic plate.

2. The method of claim 1, wherein the thermoplastic layer comprises a dimensional support layer.

3. The method of claim 1, wherein calendering the flexographic plate is preceded by attaching a dimensional support layer to the second side of the thermoplastic layer.

4. The method of claim 3, wherein attaching the dimensional support layer to the second side of the thermoplastic layer is followed by providing a cushion layer and attaching the cushion layer to the dimensional support layer.

5. The method of claim 1, wherein calendering the flexographic plate is preceded by providing a cushion layer and attaching the cushion layer to the second side thermoplastic layer.

6. The method of claim 5, wherein providing a cushion layer and attaching the cushion layer to the second side of the thermoplastic layer is followed by providing a dimensional support layer and attaching the two-dimensional structural support layer to the cushion layer.

7. The method of claim 3, wherein the dimensional support layer is a PET layer.

8. The method of claim 4, wherein the cushion layer is a thermoset material.

9. The method of claim 4, wherein the cushion layer is a thermoplastic material.

10. The method of claim 1, wherein the series of heated pairs of rollers are located along a flexographic plate movement path.

11. The method of claim 10, wherein the heat of said pairs of rollers decreases along the flexographic plate movement path.

12. The method of claim 1, wherein the thermoplastic layer has a thickness of at least 13 microns.

13. The method of claim 1 wherein additional layers are added prior to calendering the flexographic plate.

* * * * *